United States Patent [19]

Gelperin et al.

[11] 4,236,958

[45] Dec. 2, 1980

[54] APPARATUS FOR ELIMINATING RESIDUAL SOLVENT FROM CRUMBLED POLYMER

[76] Inventors: Nison I. Gelperin, 2 Obydensky pereulok, 10, kv. 5; Leonid M. Polotsky, Leninsky prospekt, 64, kv. 170, both of Moscow; Nikolai A. Konovalenko, ulitsa Lenina, 27/40, kv. 46, Efremov Tulskoi oblasti, all of U.S.S.R.

[21] Appl. No.: 37,017

[22] Filed: May 8, 1979

[51] Int. Cl.$^3$ .............................................. B01D 1/14
[52] U.S. Cl. ........................... 159/16 S; 159/DIG. 10; 528/500
[58] Field of Search ........................ 422/901; 528/500; 159/16 S, DIG. 10, 4 CC, 4 ST

[56] References Cited

U.S. PATENT DOCUMENTS

| 3,306,342 | 2/1967 | Di Salvo et al. | 159/16 S |
| 3,926,927 | 12/1975 | Stookey | 159/DIG. 10 |
| 3,931,130 | 1/1976 | Beining | 528/500 |
| 4,130,527 | 12/1978 | Miller et al. | 528/500 |

*Primary Examiner*—Norman Yudkoff
*Attorney, Agent, or Firm*—Steinberg & Blake

[57] ABSTRACT

The apparatus proposed herein relates to mass-exchange apparatus for isolating polymers from hydrocarbon solutions. The apparatus comprises a vertical column provided with a device for producing polymer crumb and an aqueous suspension, a device for feeding live steam, and contact trays which divide the column into compartments as for height. The device for producing polymer crumb and aqueous suspension is accommodated in the top portion of the vertical column and is essentially a chamber established on at least one side by the overflow baffle. The chamber accommodates the water supply nozzle and a conventional injector-type polymer crumb former. Such an arrangement of the device for polymer crumb formation and producing aqueous suspension results in a simplified construction of the entire apparatus and diminished overall dimensions thereof, as well as to a simpler attendance of the apparatus.

3 Claims, 5 Drawing Figures

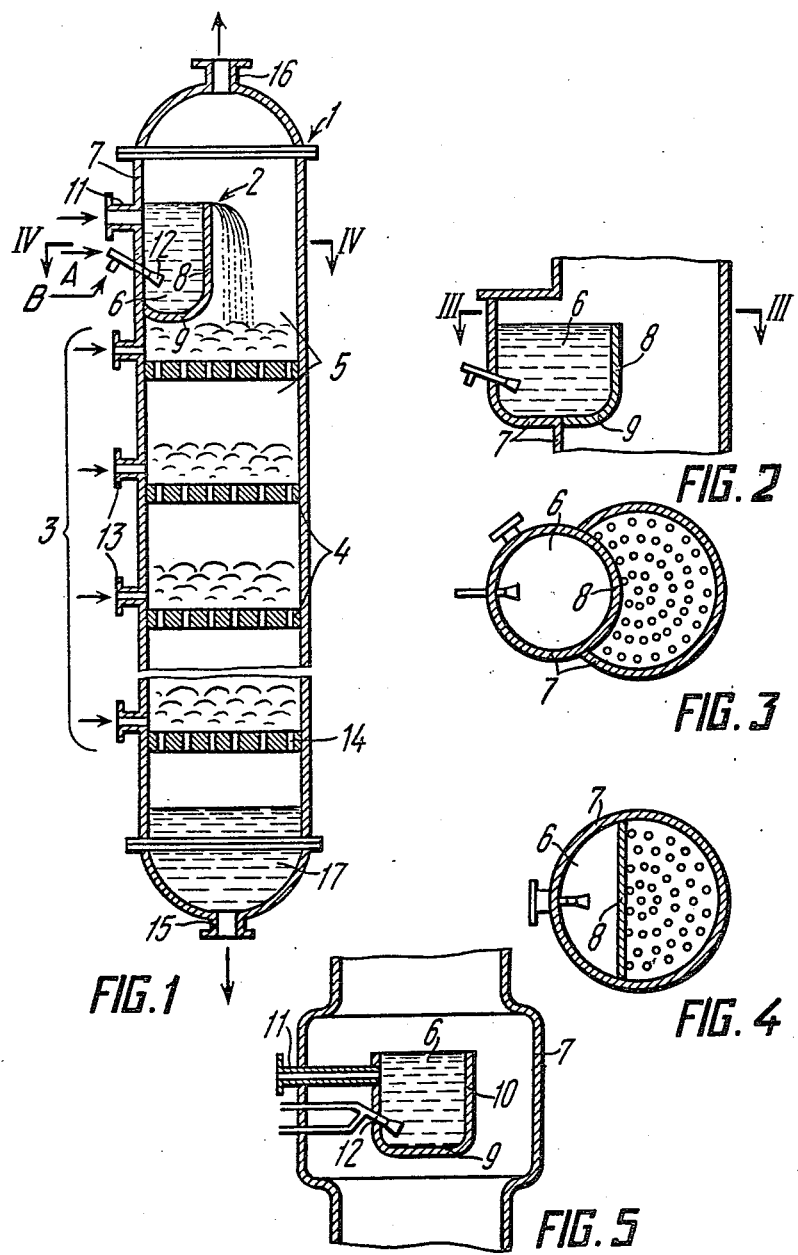

APPARATUS FOR ELIMINATING RESIDUAL SOLVENT FROM CRUMBLED POLYMER

The present invention relates generally to mass-exchange apparatus for isolating polymers from hydrocarbon solutions and more specifically to apparatus for eliminating residual solvent from crumbled polymer.

The invention can find most utility when applied for producing sythetic and natural rubber.

At present residual solvent is eliminated from polymer crumb by using double-stage apparatus. Said apparatus features its first and second stages located close to each other and intercommunicated through pipings, the first stage incorporating the device for formation of polymer crumb and aqueous suspension, while the second stage is a vertical column, wherein residual solvent is eliminated from ploymer crumb.

The vertical column is provided with live steam feeding devices, a pipe for feeding aqueous suspension carrying crumbled polymer from the first stage, as well as contact trays which divide the column into a number of vertical compartments intercommunicated for the aqueous suspension carrying polymer crumb to pass.

However, the afore-discussed double-stage apparatus proves to be too bulky and difficult-to-attend, whereas the process of eliminating the residual solvent in the vertical column is hampered due to stagnation zones liable to occur owing to poor agitation, followed by sticking of the polymer to the walls of the apparatus throughout the both stages, as well as to the walls of pipings.

Furthermore, provision is made in the double-stage apparatus in question for pumps which transfer the aqueous suspension along with polymer crumb to the vertical column, said pumps adding more to the overall dimensions of the apparatus and to the complexity of attendance thereof.

It is a primary object of the present invention to eliminate the disadvantages mentioned above.

It is an essential object of the present invention to provide such an apparatus for eliminating residual solvent from crumbled polymer that would be simple in construction and have small overall size.

It is another object of the present invention to provide such an apparatus for eliminating residual solvent from crumbled polymer that would be simple-to-attend.

It is one more object of the present invention to provide such an apparatus for eliminating residual solvent from crumbled polymer that would be instrumental in attaining high-degree elimination of residual solvent from crumbled polymer.

In keeping with said and other objects in an apparatus for eliminating residual solvent from crumbled polymer, comprising a vertical column provided with a device for producing polymer crumb and an aqueous suspension, a live steam feeding device and contact trays adapted to divide the column as for height into a number of compartment intercommunicating for said aqueous suspension along with polymer crumb to pass, according to the present invention the device for producing polymer crumb and aqueous suspension is situated in the top portion of the vertical column and is in fact a chamber established on at least one side by an overflow baffle and accommodating a water supply nozzle and a conventional injector-type polymer crumb former.

Such an arrangement of the device for producing polymer crumb and aqueous suspension simplifies much the construction of the apparatus and reduces its overall dimensions. The fact that the chamber is confined on at least one side by the overflow baffle makes it possible to dispense with any additional means for feeding the suspension into the column since the polymer crumb flows over the baffle as fast as it is formed to get immediately onto the top contact tray of the column. In addition, such a constructional arrangement of the device for producing polymer crumb and aqueous simplifies attendance of the apparatus and provides for more favourable conditions for the process of eliminating residual solvent to occur which adds much to the intensity of the solvent elimination process.

According to the present invention the injector-type crumb former makes up an angle with the bottom of the chamber which conduces to normal proceeding of the crumb formation process and its gradual ascending to the top chamber portion.

It is likewise expedient that the cross-sectional area of the chamber be in the ratio of (0.5 to 2.0):(0.5 to 10) with that of the vertical column which enables one to prevent polymer crumb from being carried away along with the exit solvent vapours.

Given below is a detailed description of an exemplary embodiment of an apparatus for eliminating residual solvent from crumbled polymer, according to the present invention, to be read in conjunction with the accompanying drawings, wherein FIG. 1 is a schematic longitudinal-section view of the apparatus, according to the invention;

FIG. 2 illustrates the chamber when partially protruding beyond the column outline;

FIG. 3 is a section taken along the line III—III of FIG. 2;

FIG. 4 is a section taken along the line IV—IV of FIG. 1; and

FIG. 5 shows the chamber when arranged along the axis of the vertical column.

Reference being now directed to the accompanying drawings the apparatus for eliminating residual solvent from crumbled polymer comprises a vertical column 1 (FIG. 1) provided with a device 2 for producing polymer crumb and aqueous suspension, a device 3 for feeding live steam and contact trays 4 dividing the column 1 as for height into compartments 5 which are intercommunicated for said aqueous suspension with said polymer crumb to pass.

The device 2 for producing polymer crumb and aqueous suspension is accommodated in the top portion of the column 1 and is in fact a chamber 6 somewhat offset with respect to the column axis and established, as can be seen from FIGS. 1 through 4, by side walls 7 of the vertical column 1 and an overflow baffle 8 whose bottom portion forms a bottom 9 (FIG. 1) of the chamber. The bottom 9 can also be defined partly by the overflow baffle 8 and partly by the side walls 7 of the column 1 as FIG. 2 represents. The chamber when seen from above is shaped either as the sector (FIG. 3) or the segment (FIG. 4) of a circle.

The chamber 6 can be arranged along the axis of the column 1 (FIG. 5) and confined on every side by an overflow baffle 10. Whatever the position assumed by the chamber 6 in the vertical column 1 (as shown in FIGS. 3, 4 and 5) the ratio between the cross-sectional area of both should make up (0.5 to 2.0):(0.5 to 10).

The chamber 6 (FIGS. 1, 2 and 5) is provided with a water supply nozzle 11 and an injector-type crumb former 12 of any conventional construction. The injector-type crumb former 12 makes up an angle of, say, 25° to 35° with the bottom 9; however, the crumb former 12 may also be arranged horizontally or at any angle other than the aforestated ones.

The live steam feeding device 3 can be formed by inlet sleeves 13 provided in the side wall 7 of the vertical column 1 above the contact trays 4 and communicated with the steam source (not shown), or by any conventional-design contrivance capable of feeding steam into the column for the process to normally proceed on every contact tray 4. Used as the contact trays 4 can be any of the known trays suitable for polymer production processes, such as synthetic rubber and provided with elements (such as perforations 14) for the compartments 5 to intercommunicate and the polymer crumb to pass from the superjacent compartment into the subjacent one.

In addition, provision is made in the vertical column 1 for agitating the polymer crumb on each of the contact trays 4 so as to prevent the crumb from depositing upon the trays 4 for assuring normal process of solvent elimination and prolong operation of the apparatus. This can be attained by any devices and methods known for those skilled in the art.

The vertical column 1 has sleeves 15 and 16 for letting out the finished polymer crumb and solvent vapours, respectively and is also provided with every electric, hydraulic and pneumatic devices necessary for the proposed apparatus to operate on an automatic cycle.

The proposed apparatus operates as follows.

The polymer crumb occurring at the outlet of the crumb former 12 when a polymer is continuously fed to the latter in the direction facing the arrow A and steam, in the direction facing the arrow B, is passed to the chamber 6. Concurrently, water is fed to the chamber 6 along the nozzle 11, whereupon an aqueous suspension results from intermixing the polymer crumb with water, said suspension being then admitted to pass through the overflow baffle 8 to the top compartment 5 and get onto the contact trays 4 and further on, through its perforations 14 onto the trays of the subjacent compartments.

Live steam is fed through the nozzles 13 to each of the trays 4, whereby residual solvent is eliminated from the polymer crumb which is consecutively passed through all stages. The residual solvent thus eliminated is permitted to ascend and is discharged from the apparatus through the sleeve 16. The polymer being handled is prevented from being stuck to the contacts trays 4 and walls of the vertical column 1 by virtue of special devices provided in the apparatus or by feeding live steam at higher velocity.

The polymer crumb which has been rid of the residual solvent passes along the vertical column from above downwards and is then forwarded for further processing through the water lock of a still 17 located in the bottom of the vertical column, and the sleeve 15.

What is claimed is:

1. In apparatus for eliminating residual solvent from crumbled polymer comprising: a vertical column; a plurality of substantially horizontal perforated contact trays vertically arranged with respect to each other within said column and dividing the latter into a corresponding plurality of intercommunicating compartments through which an aqueous suspension along with polymer crumb is adapted to pass; and means for feeding live steam into said vertical column for interacting with the polymer crumb as the latter passes through said compartments, the improvement comprising:

means for producing polymer crumb and aqueous suspension including a chamber located within an upper portion of said vertical column and an overflow baffle defining at least one side of the chamber located vertically over the uppermost one of said contact trays;

a water supply nozzle fluidly communicating with said chamber; and a conventional injector-type crumb former fluidly communicating with said chamber.

2. An apparatus as claimed in claim 1, wherein said chamber of said means for producing polymer crumb and aqueous suspension has a bottom and said conventional injector-type crumb former forms an angle with the bottom of said chamber.

3. An apparatus as claimed in claim 1, wherein the cross-sectional area of the chamber of said means for producing polymer crumb and aqueous suspension and the cross-sectional area of said vertical column stand to each other as (0.5 to 2.0): (0.5 to 10).

* * * * *